March 1, 1966     N. P. SOGOIAN     3,237,410

SAFETY DEVICE FOR HYDRAULIC BRAKE SYSTEMS

Filed April 22, 1964

INVENTOR.
NASH P. SOGOIAN

BY

ATTORNEYS

United States Patent Office 3,237,410
Patented Mar. 1, 1966

3,237,410
SAFETY DEVICE FOR HYDRAULIC
BRAKE SYSTEMS
Nash P. Sogoian, 1417 21st St., Detroit 16, Mich.
Filed Apr. 22, 1964, Ser. No. 361,710
7 Claims. (Cl. 60—54.5)

This invention relates generally to hydraulic brake systems for motor vehicles and more particularly has reference to a safety device for such systems adapted to isolate an individual wheel cylinder from the master cylinder in the event of leakage or other failure in the wheel cylinder or its adjacent fluid line.

In conventional hydraulic brake systems, a master cylinder is hydraulically connected to each of the vehicle wheel cylinders through independent fluid pressure lines. As a result of this arrangement, if a break or leak should occur in one of the wheel cylinders, fluid will be drawn from the master cylinder, thereby depriving the remaining wheel cylinders of fluid and rendering all of the brakes inoperative. This exposes the occupants of the vehicle to a serious risk of injury.

It is therefore the primary object of the present invention to provide, in a brake system of this kind, means for isolating the individual wheel cylinders from the master cylinder in the event of loss of pressure, from whatever cause, either in the wheel cylinder or in its adjacent hydraulic brake lines.

When such pressure loss occurs in one of the wheel cylinders, the leak is first repaired, the wheel cylinder valve opened, and the brake pedal depressed, in order to "bleed" out any air accumulated in the line as a result of the failure or leak. The mechanic permits the hydraulic fluid to escape through the valve continuously until the color of the emerging liquid indicates that all the entrapped air has been removed. During this "bleeding" operation, the hydraulic fluid is drawn from the entire length of the line between the master cylinder and the brake cylinder. As a result, it is possible for air entrapped adjacent the wheel cylinder to travel, in the slowly circulating fluid, to any point along the line, including the master cylinder. In this event, a substantial amount of brake fluid must be removed through the wheel cylinder valve before all the air is removed.

The problem of air entrapped along the brake line is further aggravated if the mechanic should accidentally leave the wheel cylinder valve open while the brake pedal is moved back to its upper or normal position. In such a case, air will be sucked in through the wheel cylinder valve and will be disposed along the length of the brake line between the master and wheel cylinders. Again, most of the fluid in the line will have to be drained before all of the air will be removed.

It is therefore an object of the present invention to provide a safety valve for isolating individual wheel cylinders in the event of their failure, and for substantially preventing entrapped air at the wheel cylinder from moving rearwardly along the hydraulic lines towards the master cylinder.

A further object is to provide a device of this kind which automatically isolates the leaking cylinder, and which can be reset, after repair of the wheel cylinder, by a simple manual actuation which then restores the device to automatic operation.

In a preferred embodiment of the present invention which will be subsequently described in detail, this is accomplished by providing a cylinder having one end connected to the line transmitting fluid from the master cylinder, and a second end connected to the line carrying fluid to the wheel cylinder. A pair of oppositely positioned check valves are mounted in axially extending openings in a movable piston which separates the two ends of the cylinder.

The check valves are adapted to equalize the pressure on opposite sides of the piston. When a loss of pressure occurs at the wheel cylinder, the piston is moved into abutment with the end wall of the cylinder, thereby sealing both openings in the piston and preventing fluid from passing the piston. A small plunger is manually actuated, after repair of the faulty cylinder, and thereby opens one of the check valves and permits fluid to flow only in the direction of the wheel cylinder. The second check valve remains closed, restricting flow of fluid back towards the master cylinder and preventing air in the brake line from passing the device.

The check valve which is responsive to open when the downstream pressure exceeds the upstream pressure, requires a greater pressure differential, to open, than is created merely by returning the brake pedal to its normal position with the wheel cylinder valve fully open. As a result, the air entrapped at the brake is isolated in the portion of the line downstream from the device, even when the mechanic inadvertently leaves the wheel cylinder valve open during return of the brake pedal.

An additional advantage of the present device is that it may be easily installed at any point along the length of each of the hydraulic lines between the master and wheel cylinders.

Another advantage of the present device is that it is extremely simple in construction, and hence is economical to fabricate and is reliable in operation.

Other objects and advantages of the present invention will be more readily apparent from the following detailed description of a preferred embodiment thereof. The description makes reference to the drawing in which.

Figure 1:
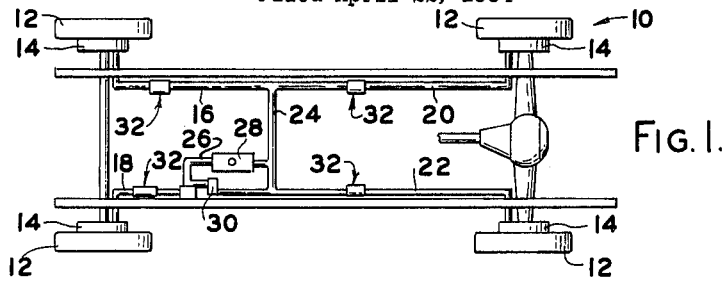
FIG. 1 is a schematic view of a vehicle four wheel hydraulic brake system having the device of the present invention mounted along each of the four hydraulic lines leading from the master cylinder to the four wheel cylinders.

Referring to the drawing in detail, FIG. 1 is a schematic view of a vehicle, generally indicated at 10, having four wheels 12, each equipped with a brake 14. The brake 14 is of the conventional variety, having a wheel cylinder adapted to be hydraulically actuated by fluid supplied through its brake lines 16, 18, 20 or 22.

The four brake lines are all supplied with fluid from a single line 24 which in turn is connected to a master cylinder 26 by means of a central brake line 28. The central brake line 28 also connects the brake pedal, indicated at 30, with the master cylinder 26. Thus, depressing the pedal 30 actuates the piston (not shown) in the master cylinder 26 and thereby increases the pressure of the fluid in the lines 28, 24, 16, 18, 20 and 22. This increase in pressure is transmitted to the brakes 14 so as to actuate all four brakes simultaneously and uniformly.

In the event of failure of one of the brakes 14 in the form of a pressure leak at the brake, the drop in pressure will be transmitted throughout the hydraulic system back to the master cylinder 26 and the brake pedal 30. If the faulty brake is leaking fluid, the entire hydraulic system will continue to supply fluid to the leak until the pressure in the system has dropped so low as to make the remaining intact brakes completely inoperative. In addition, a substantial proportion of the brake fluid will have leaked out through the faulty brake.

The present invention comprises a safety device, generally indicated at 32, one of which is installed in each of the brake lines 16, 18, 20 and 22. This device is shown in detail in FIGS. 2 and 3 as mounted along brake line 16, and generally comprises a hollow cylinder 34 open at its rearward or fluid-receiving end 36, and closed by means of an end wall 38 at its opposite end. A cylindrical cap 40 is fixed in fluid-tight fashion over the open end 36 of the cylinder 34 by means of conventional bolts 42.

The brake line 16 extends into the rearward end of the present device 32 through an opening 44 axially extending through the cap 40. The line 16 extends out of the device through a second axially extending opening 46 in the end wall 38. In this manner, fluid introduced from the master cylinder 26 through the cap 40 is subsequently transmitted to the wheel cylinder of the brake 14 through the end wall 38.

The interior of the cylinder 34 is divided into a rear chamber 48 and a forward chamber 50. The forward chamber 50 is of a larger diameter than the rear chamber 48 and is separated therefrom by means of an annular transverse wall 52 projecting radially inward from the interior wall of the cylinder 34. The end wall 38 includes a centrally disposed cylindrical depression 54.

A cylindrical member 56 is situated in the rear chamber 48 and includes a forward annular flange 58. A coil spring 60 is disposed between the rearward face of the flange 58 and the interior face of the cap 40 so as to bias the member 56 in the forward direction. A stem 62, fastened rigidly to the forward end of the member 56, extends through the central opening in the annular wall 52 and is fixed in an opening 64 in the rear face of a cylindrical piston 66.

The outer surface of the piston 66 is provided with an annular resilient seal 68 which maintains the piston in fluid-tight sliding engagement with the walls of the forward chamber 50. The piston 66 is thus slidable in the forward chamber against the resistance of spring 60 between a rear position in which the rear face of the piston abuts the annular wall 52, and a forward position in which the piston abuts the end wall 38. The piston therefore separates the fluid in the cylinder 34 into a rear body of fluid 70 in communication with the master cylinder 26, and a forward body of fluid 72 in communication with the wheel cylinder in the brake 14.

The piston 66 includes a linear inlet passage 74 extending axially through the piston and thereby providing communication between the two bodies of fluid 70 and 72. A check valve 76 in the form of a spring-biased ball 78 is adapted to open the passage 74 only when the pressure in the rear body of fluid 70 exceeds that of the pressure in the forward body 72. A second check valve 80, also constructed of a spring-biased ball 82, is disposed within a circulating passage 84 extending through the piston parallel to the inlet passage 74. The check valve 80 is biased to open only when the pressure in fluid body 72 exceeds that of body 70.

A plunger 86, comprising a cylindrical head 88 adapted to seat in the depression 54, and a threaded stem 90, is disposed in the end wall 38. The stem 90 engages the matching threads along an axially extending opening provided through the center of the depression 54. Thus, rotation of the projecting end of stem 90 causes the head 88 to move axially with respect to the depression 54.

Figure 2:
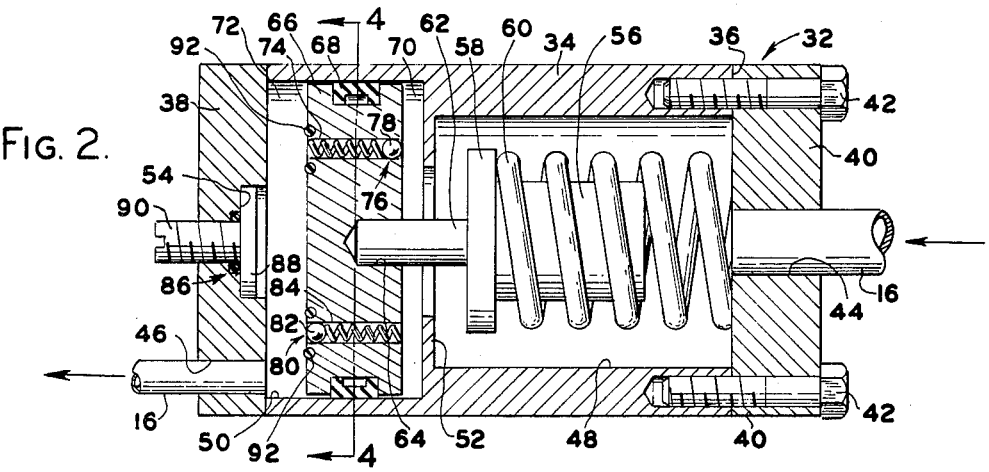
FIG. 2 is an enlarged longitudinal cross-sectional view of the safety device of the present invention in normal operating position.
Figure 4:
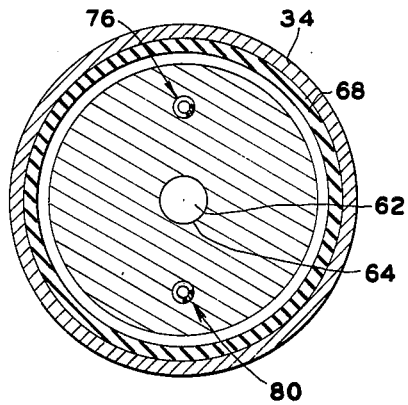
FIG. 4 is a cross-sectional view taken along the lines 4—4 of FIG. 2.

In operation, the plunger 86 is normally retracted into the depression 54, and the piston 66 disposed in the position shown in FIG. 2. The friction created by the resilient seal 68 against the walls of chamber 50 is sufficient to resist the force exerted in the forward direction by the spring 60, and permits the check valves 76 and 80 to open under the influence of a pressure differential across opposite faces of the piston 66 before the piston will move along the chamber 50. That is, the piston will move only when the pressure differential is a major one. Therefore, when there is no pressure leak in the system, depression of the brake pedal 30 increases the pressure in fluid body 70, thereby opening check valve 76 and transmitting the pressure increase to fluid body 72.

The pressure in fluid body 72 will normally build up to a magnitude exceeding that in body 70, thereby permitting valve 76 to close and valve 80 to open. This alteration in the positions of the valves 76 and 80 permits a constant equalizing of pressure on opposite sides of the piston 66 and thereby prevents the build-up of a differential in pressure of sufficient magnitude to move the piston.

When a failure occurs at the brake 14 so as to lower the pressure in the line 16 at that point, this pressure drop is communicated to the fluid body 72; the differential across the piston 66 will close valve 80, open valve 76, and move the piston 66 forward until its forward face abuts the interior surface of end wall 38. In this position, the inlet passage 74 is blocked by the wall 38, thus preventing fluid from moving through the piston. As a result, the body of fluid in the line 16 forward of the piston 66 is completely isolated from the fluid on the opposite side of the piston. An O-ring 92 of resilient material is provided at the rearward end of each passage 74 and 84 so as to seal these passages in fluid-tight fashion when the piston is in this abutting position. The drop in pressure at the faulty brake 14 is thus prevented from affecting the pressure in the remainder of the system. When the brake pedal 30 is depressed, the master cylinder 26 will increase the pressure in the remaining brake lines 18, 20 and 22 and thereby actuate their associated brakes. If two or even three brakes are defective, each remaining intact brake will continue to operate.

Figure 3:
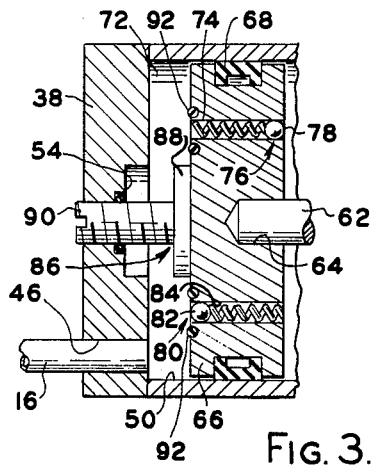
FIG. 3 is a cross-sectional view showing a portion of the structure of FIG. 2 with the reset plunger in actuated position.

After failure of the brake, and forward movement of the piston 66 into abutment with the end wall 38, the defective brake is first repaired, and the plunger 86 moved toward the piston 66, thereby moving the piston away from the end wall 38 as shown in FIG. 3. The greater pressure on the rearward face of the piston 66 will cause check valve 76 to open and check valve 80 to remain closed. The brake pedal 30 is then depressed and the wheel cylinder valve (not shown) opened in order to "bleed" out all the air in the brake line 16. With the wheel cylinder valve open, fluid will be drawn from the fluid body 70 (where it is under substantial pressure as a result of depression of the pedal 30) through the passage 74 in the piston, and thence through the line 16 where it is discharged through the wheel cylinder valve.

In conventional hydraulic brake systems, the danger involved in this "bleeding" operation is created by the likelihood that air entrapped in the line adjacent the wheel cylinder will move into the line adjacent the master cylinder. If this occurs, substantially all the fluid in the line will have to be drained through the wheel cylinder valve before all the air can be removed. Such a rearward movement of the air will occur, ordinarily, when the brake pedal is raised back to its normal position. Since the pedal must necessarily be repeatedly depressed and raised, it is virtually impossible to prevent the entrapped air from moving rearwardly along the line. As a result, bleeding of conventional brake systems has always required the removal of a very large portion of the fluid in the faulty brake line.

When the present safety device is employed, however, such movement of the entrapped air is impossible. In FIG. 3, with the pedal depressed and the wheel cylinder valve open, the pressure will be greatest on the rear side of the piston 66 so that the check valve 76 will be open, and the check valve 80 closed. As a result, fluid will flow in the forward direction only, thereby preventing any rearward movement of the entrapped air.

If the wheel cylinder valve is properly closed while the pedal is raised, the pressure on the rearward side of the piston 66 will be reduced, thereby substantially equalizing the pressure on opposite sides of the piston, and closing valve 76. The sequential opening and closing of the wheel cylinder valve and the depression and return of the brake pedal 30, will be repeated until the color of the fluid issuing through the wheel cylinder valve indicates that the air has been exhausted. Since the piston check valves have only been open long enough to permit fluid flow in the forward direction only, any air in the system is necessarily isolated in the portion of the line 16 between the safety device 32 and the brake 14. Thus, a relatively small amount of fluid will have to be drained in order to remove all the air from the system. As the fluid is bled in this manner, the pressure on the opposite sides of the piston 66 will gradually equalize to the point where the plunger 86 can be retracted and the piston 66 will remain in a balanced position in chamber 50.

If the mechanic should accidentally leave the wheel cylinder valve open while the pedal 30 is returned to its upper position, the pressure in fluid body 70 will be less than that in fluid body 72 which is communicative through the wheel valve with atmospheric pressure. If no safety device of the present kind is installed, the suction created in the line would pull air into the line through the wheel cylinder valve. This entrapped air would be disposed all along the length of the brake line.

When the present device is installed in the brake line, fluid will not flow rearwardly through the piston check valve 80, in such a case, unless the pressure differential exceeds the force of the spring biasing the ball 82 towards its closed position. The tension in this spring is sufficient to prevent opening of the valve under the pressure differential between atmospheric pressure and the low pressure created by raising the brake pedal 30. In other words, check valve 80 will not open merely because the wheel cylinder valve is left open while the pedal is returned to its upper position; the pressure differential must be in excess of that which would exist under those conditions.

Thus the present device not only serves to maintain the remaining brakes in operating condition after failure of one of the brakes, but it also permits bleeding of the faulty brake with a minimum loss of hydraulic fluid from the system.

It will be apparent to those skilled in the art to which this invention pertains that various changes and modifications in the structure of the herein disclosed embodiment may be made without departing from the spirit of the invention or the scope of the appended claims.

I claim:

1. A safety device for a hydraulic brake system including pressure applying means adapted to control the pressure in a fluid communicative with pressure-actuated brake means, comprising;
   (a) a housing;
   (b) a piston movable in said housing and adapted to separate fluid disposed in said housing into first and second bodies, respectively communicative with the fluid in said pressure applying means and said brake means, said piston being movable in said fluid only in response to major pressure differentials across said piston;
   (c) first valve means provided in a first passage extending through said piston between said first and second fluid bodies, said valve means being adapted to open in response to a minor pressure excess in said first body with respect to said second body;
   (d) means adapted to block said first passage when said piston is moved in response to a major pressure excess in said first body with respect to said second body;
   (e) second valve means provided in a second passage extending through said piston between said first and second fluid bodies, said second valve means being adapted to open in response to a pressure excess in said second fluid body with respect to said first body, and
   (f) means adapted to open said first passage after it has been blocked by said blocking means due to said movement of said piston.

2. The structure as set forth in claim 1 and wherein said to be repeatedly depressed and returned, each depression thereof producing an increase of pressure in said first fluid body, and each return thereof relieving said pressure, said second valve means being adapted to remain closed when the fluid at said brake means is exposed to atmospheric pressure and said brake pedal is simultaneously returned.

3. A safety device for a hydraulic brake system including pressure applying means adapted to control the pressure in a fluid communicative with pressure-actuated brake means, comprising:
   (a) a housing;
   (b) a piston movable in said housing and adapted to separate fluid disposed in said housing into first and second bodies, respectively communicative with the fluid in said pressure applying means and said brake means, said piston being movable in said fluid only in response to major pressure differentials across said piston, said piston being adapted to move into abutment with a wall of said housing in response to a major pressure excess in said first fluid body with respect to said second body;
   (c) first valve means provided in a first passage extending through said piston between said first and second fluid bodies, said valve means being adapted to open in response to a minor pressure excess in said first body with respect to said second body, said passage being adapted to be blocked by said wall when said piston is moved into abutment therewith;
   (d) second valve means provided in a second passage extending through said piston between said first and second fluid bodies, said second valve means being adapted to open in response to a pressure excess in said second fluid body with respect to said first body;
   (e) and means adapted to move said piston away from said wall after abutment therewith and thereby to permit flow of fluid through said first passage.

4. The structure as set forth in claim 3 and wherein said pressure applying means includes a brake pedal adapted to be repeatedly depressed and returned, each depression thereof producing an increase of pressure in said first fluid body, and each return thereof relieving said pressure, said second valve means being adapted to remain closed when the fluid at said brake means is exposed to atmospheric pressure and said brake pedal is simultaneously returned.

5. A safety device for a hydraulic brake system including pressure applying means adapted to control the pressure in a fluid communicative with pressure-actuated brake means, comprising:
   (a) an elongated housing;
   (b) a piston axially movable in said housing and adapted to separate fluid disposed in said housing into first and second bodies respectively communicative with the fluid in said pressure applying means and said brake means, said piston being movable between a normal position and second position in which the portion of said piston exposed to said second fluid body closely abuts an end wall on said housing;
   (c) means normally retaining said piston in said normal position and permitting said piston to move into said second position only in response to a major pressure excess in said first fluid body with respect to said second body;
   (d) a first valve provided in a first passage extending through said piston between said first and second fluid bodies, said valve means being adapted to open in response to a minor pressure excess in said first fluid body with respect to said second body, said passage being adapted to be blocked by said wall when said piston is moved into abutment therewith;

(e) a second valve provided in a second passage extending through said piston between said first and second fluid bodies, said second valve means being adapted to open in response to a pressure excess in said second fluid body with respect to said first body;

(f) and means adapted to move said piston away from said wall after abutment therewith and thereby permitting flow of fluid through said first passage.

6. The structure as set forth in claim 5, wherein said means adapted to move said piston away from said wall comprises a stem axially adjustably mounted in said wall, and a head on said stem adapted to seat in a depression on the interior of said wall when said stem is retracted, said head bearing against said piston and moving it away from said wall as said stem is advanced with respect to said wall.

7. The structure as set forth in claim 5 and wherein said pressure applying means includes a brake pedal adapted to be repeatedly depressed and returned, each depression thereof producing increase of pressure in said first fluid body, and each return thereof relieving said pressure, said second valve means being adapted to remain closed when the fluid at said brake means is exposed to atmospheric pressure and said brake pedal is simultaneously returned.

References Cited by the Examiner

UNITED STATES PATENTS

| | | | |
|---|---|---|---|
| 1,936,504 | 11/1933 | Foster et al. | 303—84 |
| 2,591,793 | 4/1952 | Dubois et al. | 60—54.5 |
| 2,805,737 | 9/1957 | Griffin | 60—54.5 X |
| 2,899,024 | 8/1959 | Hamilton et al. | 60—54.5 X |

FOREIGN PATENTS

| | | |
|---|---|---|
| 370,690 | 4/1939 | Italy. |

SAMUEL LEVINE, *Primary Examiner.*

ROBERT R. BUNEVICH, *Examiner.*